United States Patent [19]

Coates et al.

[11] Patent Number: 4,682,229
[45] Date of Patent: Jul. 21, 1987

[54] CONTROLLING THE GREY LEVELS REPRESENTED BY A VIDEO SIGNAL

[75] Inventors: Philip V. Coates, Sunbury-on-Thames; Brian J. Eaton, Staines, both of England

[73] Assignee: Emi Limited, Hayes, England

[21] Appl. No.: 189,934

[22] Filed: Sep. 19, 1980

[30] Foreign Application Priority Data

Sep. 21, 1979 [GB] United Kingdom ............... 7932777

[51] Int. Cl.$^4$ .................... H04N 5/14; H04N 5/208
[52] U.S. Cl. .................................................. 358/166
[58] Field of Search ............... 358/125, 126, 160, 163, 358/167, 166

[56] References Cited

U.S. PATENT DOCUMENTS 3,979,555  9/1976  Opittek et al. ............... 358/160
4,268,863  5/1981  Los ............................... 358/160

OTHER PUBLICATIONS

Weszka et al—"Threshold Evaluation Techniques", *IEEE Transactions on Systems, Man, and Cybernetics*, vol. SMC-8, No. 8, Aug. 1978, pp. 622–629.

Nakagawa et al—"A Note on the Use of Local Min and Max Operations", *IEEE Transactions on Systems, Man, and Cybernetics*, vol SMC-8, No. 8, Aug. 1978, pp. 632–635.

*Primary Examiner*—Theodore M. Blum
*Attorney, Agent, or Firm*—Fleit, Jacobson, Cohn & Price

[57] ABSTRACT

A digital buffer store 25 (FIG. 2) stores digitized samples of a video signal. A circuit 206 determines the mean grey level (f(b)) of the stored signals and a circuit 28 forms a histogram indicating the number of pixels having various ones of 8 possible grey leves. A circuit 29 determines the dispersion of the histogram about the mean grey level. In principle, circuit 29 could determine from the means level and the histogram the statistical distribution of pixels amongst the grey levels and from that determine the standard deviation as a measure of dispersion. In practice, the circuit 29 determines an emirical approximation to the dispersion, $$f(a) = \left[ \sum_{i=0}^{2^n} N_i^2(|A - i| - 1) \right] - \frac{N_A}{2}$$

where
n = number of binary bits = 3
$N_i$ = number of pixels having a grey level i
A = f(b) = mean grey level
$N_A$ = number of pixels having the means grey level.

This equation is advantageous as it operates on powers of 2.

Figure 2:
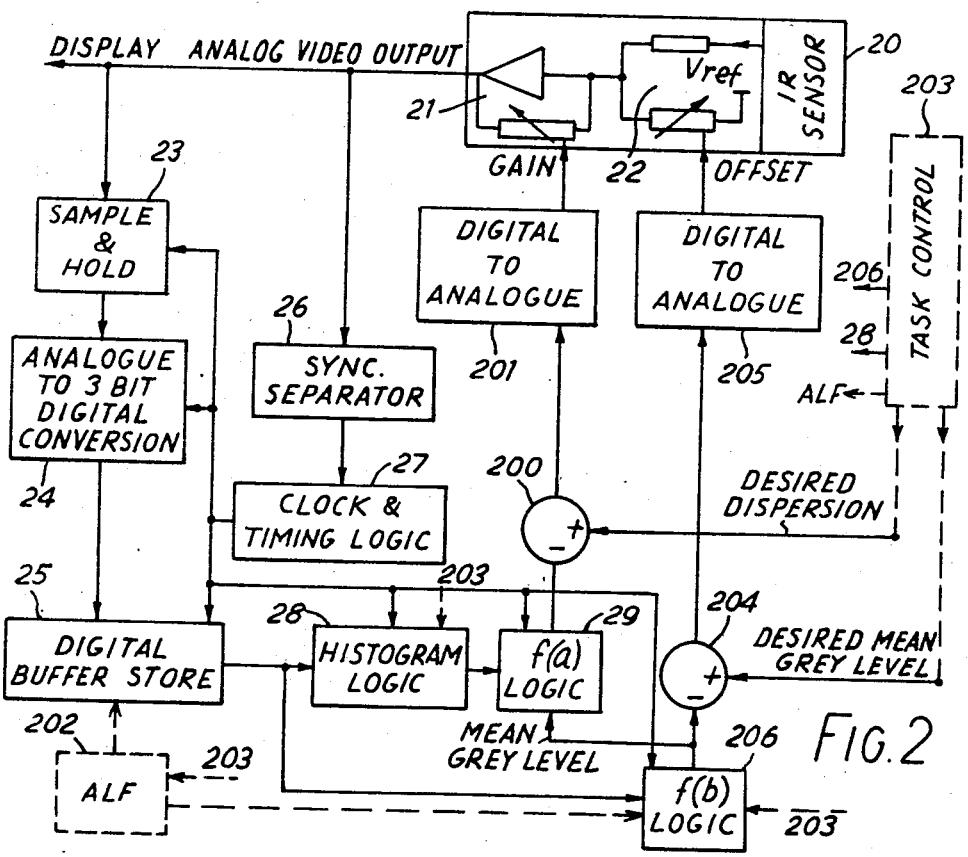

The circuit of FIG. 2 compares the determined values of f(a) and f(b) with empirically derived desired values and servoes the gain and D.C. Offset applied to the video signals in a circuit 20.

18 Claims, 6 Drawing Figures

CONTROLLING THE GREY LEVELS REPRESENTED BY A VIDEO SIGNAL

The present invention relates to controlling the grey levels represented by a video signal representing a scene.

In order to discriminate between objects of interest and background or noise in some classes of scenes, thresholding has been used. In an example of thresholding, those image points whose grey levels are darker than the threshold are mapped into "black" and the remaining points into "white" resulting in a two level picture: (Threshold Evaluation Techniques"—Weska and Rosenfeld—I.E.E.E. Transactions on Systems, Man, and Cybernetics—Vol. SMC 8 No. 8 August 1978 p622 to 629).

Another technique may be used to reduce noise in an image having more than two grey levels. This technique involves replacing the grey level of each pixel by the minimum (or maximum) level of it and its neighbours: see I.E.E.E. Transactions Vol. SMC 8 No. 8 August 1978 p632 to 635—Nakagawa and Rosenfeld.

It is an object of the present invention to provide an alternative technique for enhancing the discrimination of an object from background in a scene.

According to one aspect of the invention there is provided a method of controlling the grey levels represented by a video signal indicative of a plurality of pixels forming a representation of a scene comprising the steps of determining the mean grey levels of a portion, at least of the video signal representing a corresponding part of the scene, determining the value of an indication of a dispersion, relative to said mean levels of grey levels exhibited by the pixels representing said part, comparing the determined values with corresponding desired values, and varying the video signal to reduce differences between the determined and desired values.

According to another aspect of the invention there is provided an apparatus for controlling the grey levels represented by a video signal indicative of a plurality of pixels forming a representation of a scene, comprising means for storing a portion of the video signal representing at least part of the scene, means for determining the mean grey level of the stored video signal, means for determining the value of an indication of a dispersion, relative to said mean level, of the grey levels exhibited by the pixels representing said part, means for comparing the determined mean level with a desired mean level, means for comparing the determined value of the indication of dispersion with a desired level of the indication of dispersion, and means responsive to the comparisons to vary the video signal in a sense to reduce the differences between each of the said determined values and its corresponding desired value.

Figure 1:
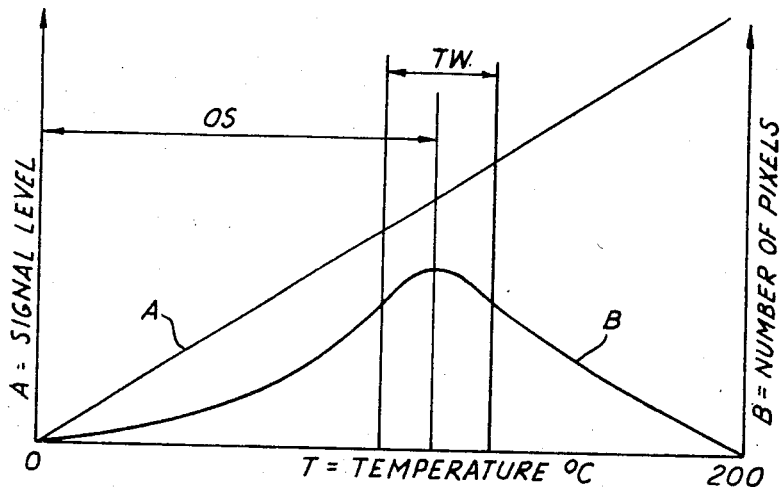
Figure 3:
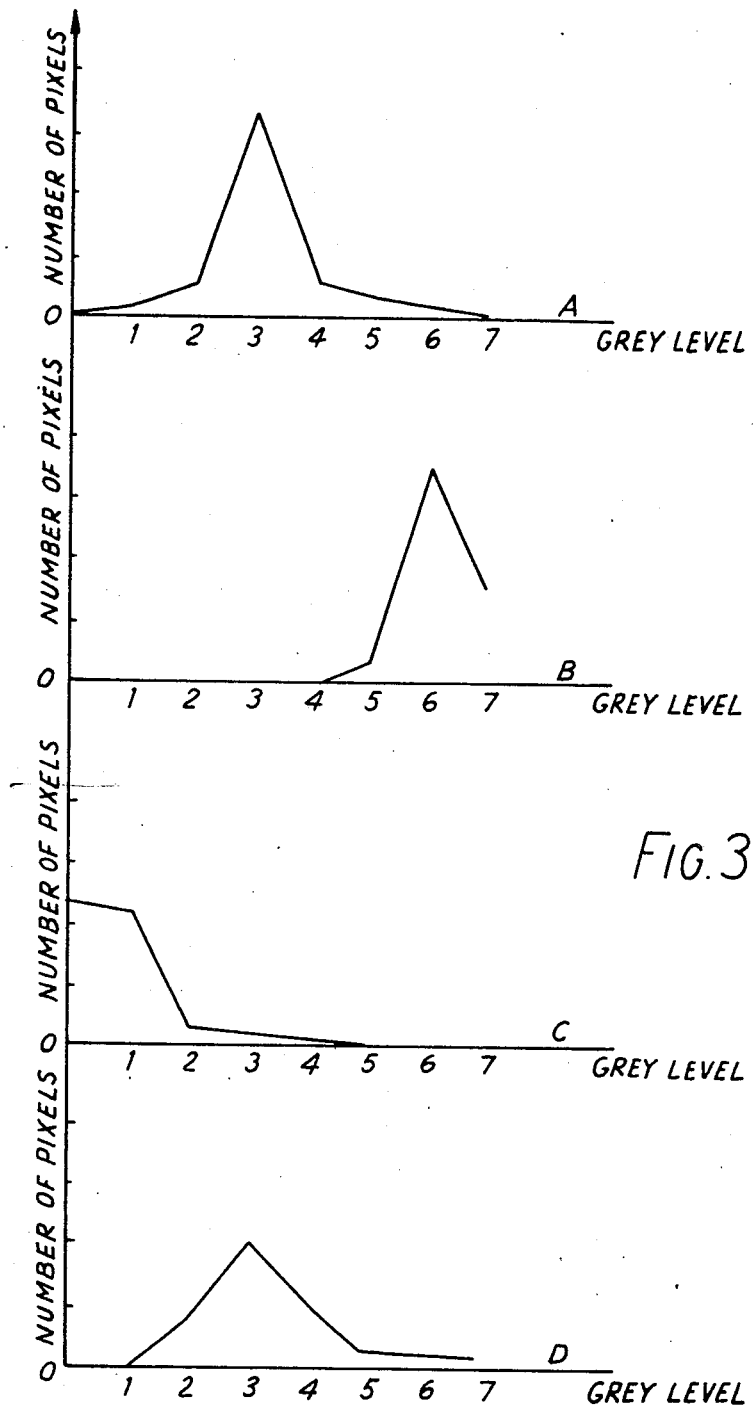
Figure 4:
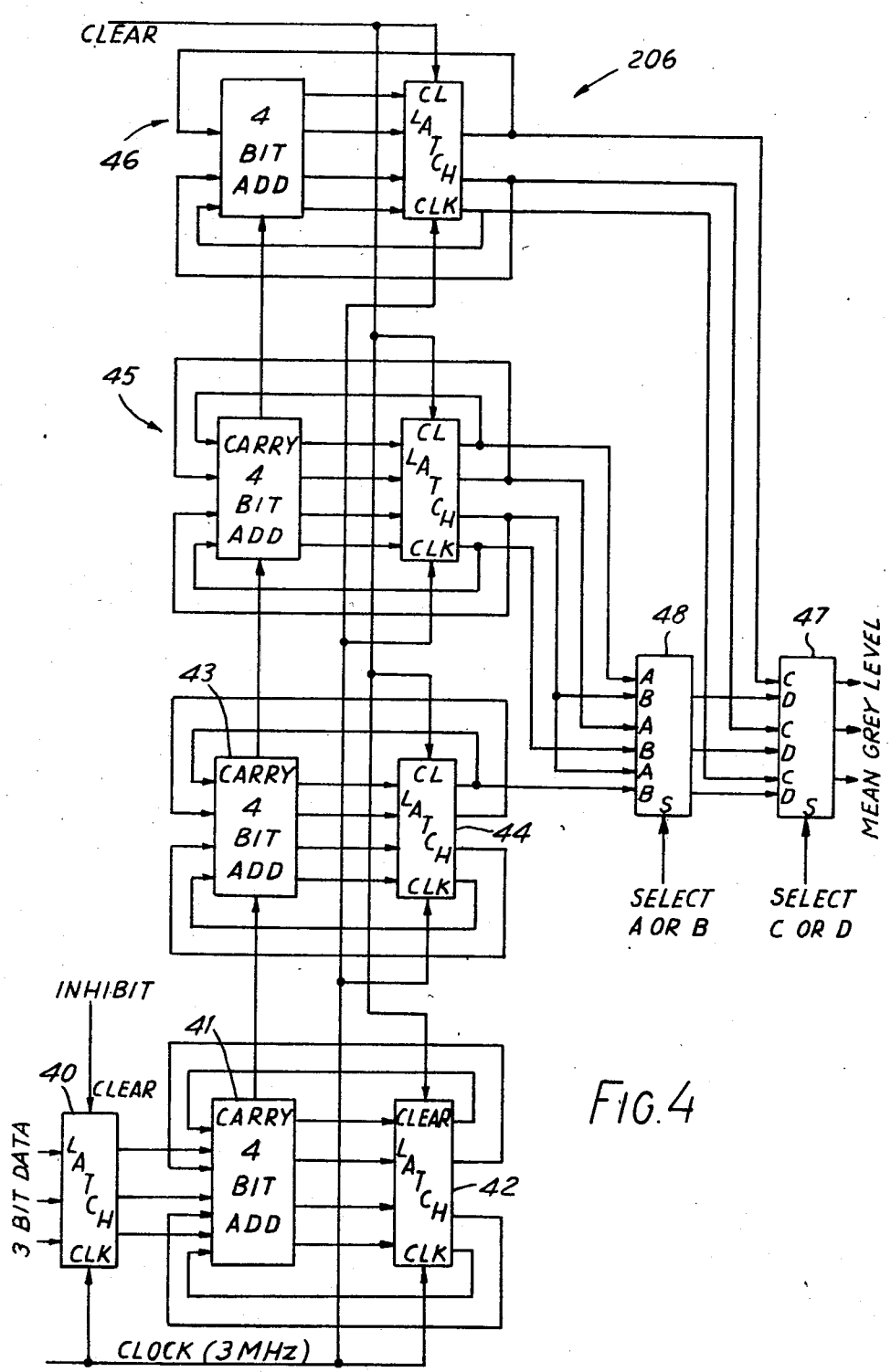
Figure 5:
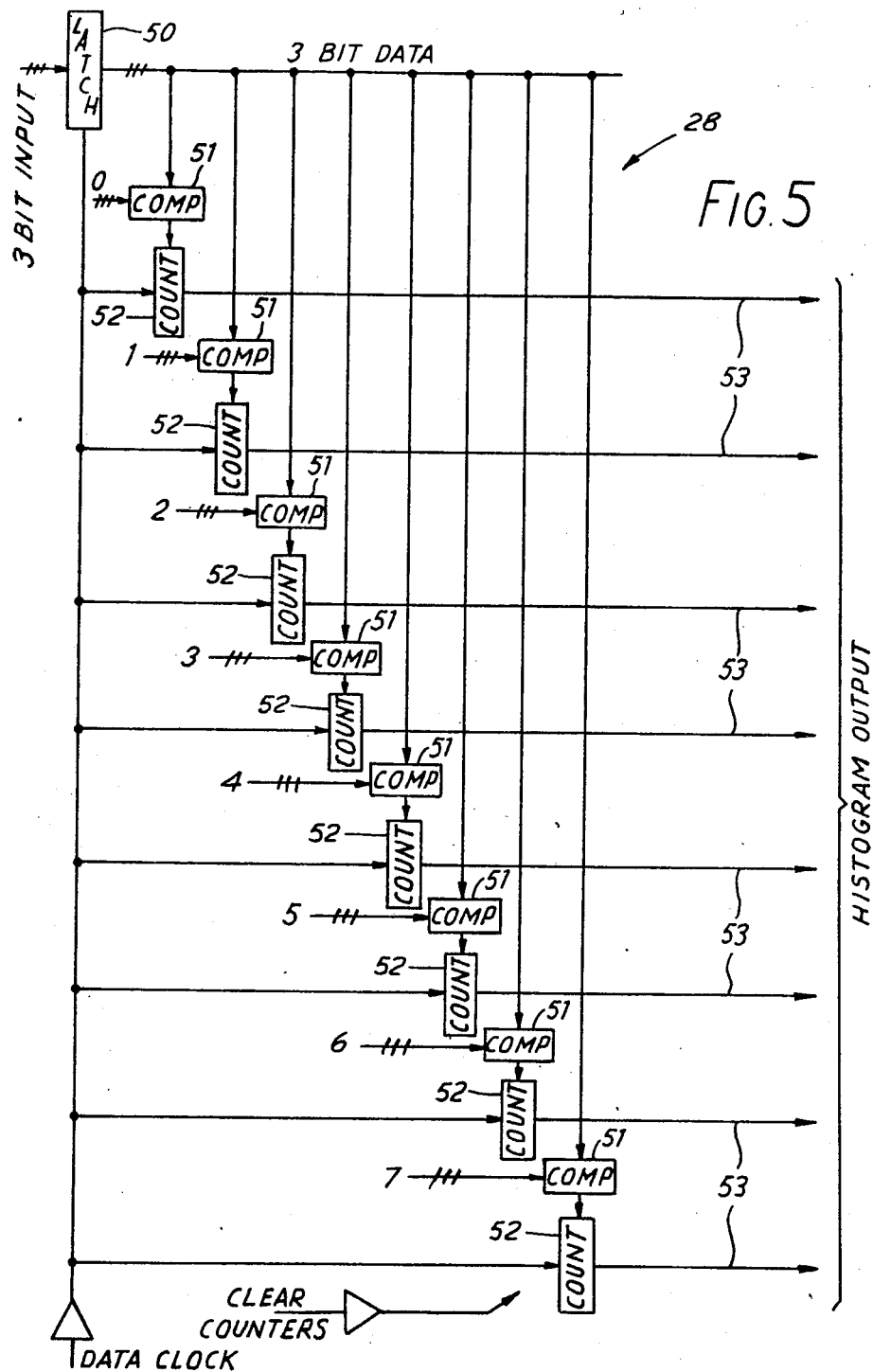
Figure 6:
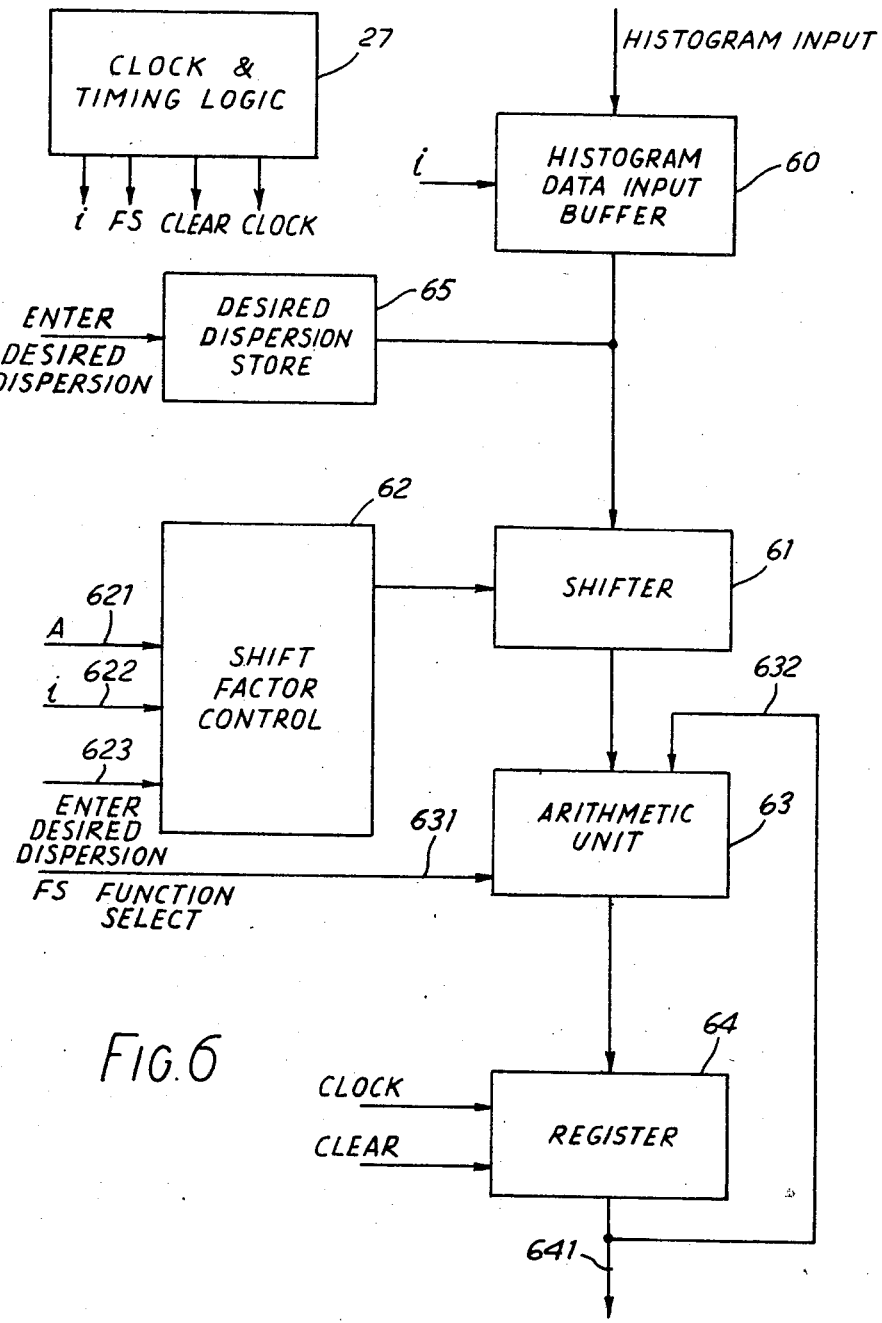

For a better understanding of the present invention, reference will now be made, by way of example, to the accompanying drawings, in which:

FIG. 1 comprises a graph of signal level versus scene temperature for a thermal imaging system and a graph showing the distribution of pixels with temperature for the same system, FIG. 2 is a block diagram of a thermal imaging system according to the invention, FIGS. 3A to D are diagrams illustrating the operation of the system of FIG. 2, FIG. 4 is a block diagram of a circuit of the system of FIG. 2 for determining mean grey level, FIG. 5 is a block diagram of a circuit for the system of FIG. 2 for determining a histogram of the distribution of pixels over temperature, and FIG. 6 is a block diagram of a circuit of the systems of FIG. 2 for determining the value of an indication of the dispersion of the values of grey levels about the mean grey level and for determining the difference between that value and a desired value.

Referring to FIG. 2, the imaging system comprises an infra-red T.V. camera 20 for viewing a scene. The TV camera has a dynamic range of from example 0° C. to 200° C. with a resolution of 0.1° C. giving 2000 grey levels. The variation of signal level is shown schematically by straight-line A in FIG. 1; in practice this line would have the form $A = RT^\gamma$ where A = signal level and T = temperature, R = constant and $\gamma$ defines a desired contrast law. A conventional television display device can display approximately only 60 to 100 grey levels and so only a portion of the dynamic range of the camera can be used. The present invention aids the ability to discriminate objects of interest (hereinafter referred to as "targets") from background or noise in the displayed image of the scene by controlling the distribution of the temperature in the chosen portion (hereinafter referred to as the "temperature window") of the dynamic range amongst the pixels in the displayed image and the position (hereinafter referred to as "offset") of the temperature window in the range.

Referring to FIG. 1 the temperature window is indicated by TW and the offset, which is the displacement of the centre of TW from the datum temperature, e.g. 0° C., is indicated by OS, for an arbitrarily chosen position. The temperature window is defined in the IR camera 20 by the gain applied to the video signal by a variable gain amplifier 21 and the offset is defined by a DC bias applied to the amplifier by a variable bias circuit 22.

The analogue video signal produced by the camera and supplied to the display is also supplied via a sample and hold circuit 23 to an analogue to 3 bit digital converter 24. The converter may provide words which are 3, 4, 5 or 6 bits long. Preferably, 3 bit words are used. The resulting 3 bit words are then stored in a digital buffer store 25. Thus the scene is represented by 8 grey levels in the store 25. A sync. separator 26 and a circuit 27, which responds to the sync. separator and produces clock and timing pulses, controls the circuit 23, converter 24 and store 25 so that the store 25 stores one frame of video information. The temperature window and offset are controlled in dependence on information in the whole frame, or on information in part of the frame selected in a manner described hereinafter.

Firstly, a circuit 206 determines the mean value of the digitised information i.e. the mean grey level, in the whole frame or the selected part of the frame, in accordance with the equation $$f(b) = \frac{\sum_{P=0}^{Q} Np}{Q}$$

where

Np = binary value of pixel p
Q = number of pixels in the whole frame or the selected part of the frame, whichever is used.

This mean value f(b) is compared with a desired mean value in a comparator 204. The difference between the values is converted to analogue form in a digital to analogue converter 205 and used to set the D.C. bias in the bias circuit 22.

Once the mean grey level f(b) is determined, the distribution of the temperatures in the temperature window amongst the pixels in the whole frame or part of the frame is determined. In this example of the invention, this is achieved using:

(i) a circuit 28 which forms a histogram indicating for each of the eight possible grey levels represented in the store 25, the number of pixels in the whole frame or part of the frame having that level; and (ii) a circuit 29 which determines the dispersion of the histogram about the mean grey level, according to an empirically derived equation $$f(a) = \left[ \sum_{i=0}^{2^n} N_i^2(|A - i| - 1) \right] - \frac{N_A}{2}$$

where
n = No. of binary bits = 3,
$N_i$ = number of pixels having a grey level i
A = average grey level = f(b), and
$N_A$ = number of pixels having the average grey level.

(The circuits 28 and 29 will be described in more detail hereinafter). The value f(a) of dispersion is compared with a desired value of dispersion in a comparator 200. The difference between the values is converted to analogue form in a digital to analogue converter 201 and applied to the amplifier circuit 21 to control its gain.

In principle, it is possible to determine the statistical distribution of the pixels amongst the grey levels and use the standard deviation or variance of the distribution as a measure of dispersion, instead of the value f(a) determined by the above empirical equation. However the equation in f(a) is easier to deal with than standard deviation because it operates on powers of 2.

The effect of the operation of the system of FIG. 2 will now be described with reference to FIGS. 1 and 3. Assume a scene on land when viewed using the whole dynamic range of the IR camera 20 has a distribution of pixels over the whole temperature range having a form approximating to that shown in FIG. 1 by line B, in which the average temperature has a relatively large number of pixels, and the extreme temperatures have relatively few pixels. It is essential to the operation of the system that the number of pixels having a certain temperature varies with temperature, B being an example of such variation.

If the offset is varied, for a constant temperature window, the distribution of pixels amongst the 8 grey levels varies, as shown by way of example in FIGS. 3A to C. In FIG. 3A, a histogram for one offset and dispersion is illustrated. If the offset varies in the direction of increased grey level from that one, the number of pixels at high values of grey level increases and thus the value of mean grey level f(b) increases (3B). If the offset varies in the opposite direction, the mean grey level f(b) decreases (3C).

If the width of the window varies for constant offset the histogram changes shape, becoming flatter for increase in width as shown in FIG. 3D, or higher for decrease in width. Thus the value f(a), which indicates the width of the histogram, varies with window width.

As shown in FIGS. 3A to D, the dispersion changes with offset. The effect of the offset and dispersion on the appearance of the displayed images is as follows. Let it be assumed that with the offset and dispersion arranged as shown in FIG. 3A, the displayed image has a grey scale similar to that of a good monochrome, standard T.V. picture. The offset and dispersion of FIG. 3B produce an image which is whiter and that of FIG. 3C produce an image which is blacker. The image produced by the offset and dispersion of FIG. 3D would appear to be more uniformly grey, with smaller contrast than the image of FIG. 3A.

Using the system of FIG. 2, the offset and dispersion can be controlled to maintain a desired appearance for the displayed image, by suitably setting the desired dispersion and desired mean grey level applied to the comparators 200 and 204. The setting depends on the task for which the displayed image is used and also on, for example, the weather conditions of the scene. The setting is determined empirically.

As mentioned hereinbefore, the information in a whole frame or only part of a frame may be used to control the offset and dispersion. If part of a frame is used the part may comprise a sample of pixels taken at random over the whole frame, or for example over the centre ⅓ of the frame, where the scene comprises sky and foreground which are not of interest. Alternatively the part of the frame may be selected by an auto-lock-follow (ALF) system (dashed block 202 in FIG. 2). In such a system a correlator compares a reference image of a desired target with the image of the scene and tracks the movement of the target in the scene. The part of the frame selected by the ALF system is a portion of the image surrounding the target and this portion is used to control the offset and dispersion.

A task control interface (dashed block 203 in FIG. 2) may be provided by which an operator of the system can select the desired dispersion and mean grey level according to the task and conditions, and if an ALF system is provided, to designate targets to be tracked.

Although the invention has been described by way of example with reference to a thermal imaging system, it is applicable to other imaging systems such as conventional television.

The invention has been described with reference to scene on land because such a scene has a distribution of pixels over temperature which facilitates the operation of the system. Because of the uniformity of a seascape, the operation of the system over sea will be more difficult.

The circuits 206, 28 and 29 of the system of FIG. 2 will now be described, with reference to FIGS. 4 to 7.

FIG. 4 shows the circuit 206 for determining the mean grey level f(b). The 3 bit data representing each pixel in the store 25 is fed via a latch 40 to a first adding stage comprising a 4 bit adder 41 and latch 42. The data is added by the adder to the previous total produced by the adder which is stored in the further latch 42. The carry from each addition is fed to a further adding stage comprising a 4-bit adder 43 and a latch 44. Yet further similar adding stages 45 and 46 are provided to enable, in this example, the addition of the values of 4096 pixels which would produce a 15 bit binary number. The mean grey level is produced by dividing the sum of the values of the pixels by the number of pixels this being achieved simply by selecting the appropriate number of most significant bits in the number. For instance if $4096=2^{12}$ pixels are used to form the average, the 3 most significant bits are selected from the last stage 46 of the adder, using the selector circuit 47 which couples the inputs marked C to the output marked "MEAN GREY LEVEL" in FIG. 4. If $512=2^9$ pixels are used to form the average, the addition of their values produces a 12 bit number and again the 3 most significant bits are selected by a selector circuit 48 which couples the inputs marked C to inputs marked D of the selector 47 which is set to couple these inputs D to the output. If $128=2^6$ pixels are used, the inputs marked B in selector 48 are selected. The selection of the inputs A, B, C and D is performed according to the task to be performed and the conditions prevailing. It may be performed by the operator via the task control interface 203, or by the ALF system.

The circuit 28 which forms the histogram is shown in FIG. 5, in which a bundle of parallel connections is denoted by a single line and a number of oblique lines equal to the number of connections in the bundle. The 3 bit data representing the pixels is applied via a latch 50 to each of eight comparators 51 where it is compared with data representing the eight grey levels 0 to 7. Associated with each comparator 51 is a counter 52, th count of which is incremental by one for each pixel having a grey level equal to the level associated with that counter. Thus the circuit produces eight numbers representing the number of pixels having the respective grey levels. These numbers are periodically fed in serial form via histogram output lines 53 to the circuit 29 which determines the dispersion.

The circuit 29 is incorporated into the circuit shown in FIG. 6 and which determines the dispersion according to the equation $$f(a) = \left[ \sum_{i=0}^{2^n} N_i^2(|A - i| - 1) \right] - \frac{N_A}{2}$$

The circuit of FIG. 6 also incorporates the comparator 200 and determines the difference between the actual dispersion f(a) and the desired dispersion.

Referring to FIG. 6, a histogram data input buffer 60 receives from the histogram logic circuit 28 the binary digital values $N_i$ representing the number of pixels having the grey levels i. These values $N_i$ are each fed to a shifter 61 where the binary digits of each value are shifted by $(|A-i|-1)$ places under the control of a shift control unit 62.

The shift control unit 62 comprises a read-only-memory (ROM) which has a first address input 621 which receives an address A representing the mean grey level from the circuit 206 for determining the mean grey level, and a second address input 622 which receives an address i representing the grey level. The ROM contains at the addresses A, i the corresponding values $(|A-i|-1)$ except at the address A=i. The values $(|A-i|-1)$ are the numbers of binary places by which the values $N_i$ are to be shifted, positive values being shifted in one direction and negative values in the opposite direction. The address A=i contains such shift value as reduces the value $N_i$ to zero.

The values of $N_i 2^{(|A-i|-1)}$ are fed from the shifter 61 to an arithmetic unit 63 which initially acts as an adder under the control of a function control input 631. Each value is added to the sum of the preceding values, which sum is received from a register 64 via an input 632, and the total fed to the register 64 for addition to the succeeding value.

Because the value $N_i 2^{(|A-i|-1)}$ for A=i is shifted so as to make it zero, and therefor does not contribute to the total stored in the register, the value $-N_A/2$ indicated in the equation f(a) is automatically accounted for. Thus once all the values of Ni except for i=A have been added together the register 64 contains the value f(a).

Once all the values Ni have been added together, the arithmetic unit 63 is controlled via input 631 to act as a subtractor, the shift factor controller is set to zero shift via an input 623, and the desired value of dispersion is fed to the arithmetic unit, via the shifter from a desired dispersion store 65, which is preloaded with the desired value. The arithmetic unit determines the difference between the value f(a) in the register 64 and the desired value, and the difference is fed to an output 641 via the register.

FIG. 6 indicates in block 27 timing and control logic which ensures that the blocks 60 to 64 operate in the desired manner at the appropriate time. Such timing and control logic is known to those skilled in the art and requires no detailed description here. Although the blocks of FIG. 6 are connected by single lines, it is to be appreciated that such lines indicate, in many cases, a plurality of connections.

What we claim is:

1. A method of controlling the grey levels represented by a video signal indicative of a plurality of pixels forming a representation of a scene comprising the steps of
    determining the mean grey level of a portion, at least of the video signal representing a corresponding part of the scene,
    determining the value of an indication of a dispersion, relative to said mean level of grey levels exhibited by the pixels representing said part,
    comparing the determined values with corresponding desired values, and
    varying the video signal to reduce differences between the determined and desired values.

2. A method according to claim 1, wherein the pixels represented by the video signal are represented by n bit binary numbers and the said indication of dispersion is a function of powers of 2.

3. A method according to claim 2 wherein n is in the range 3 to 6.

4. A method according to claim 2 wherein n equals 3.

5. A method of controlling the grey levels represented by a video signal representing a scene comprising the steps of determining the mean grey level of a portion of the video signal representing at least a part of the scene,
    determining the value of an indication of the dispersion, f(a), of values of grey level of said portion where f(a) is given by an empirical equation, $$f(a) = \left[ \sum_{i=0}^{2^n} N_i^2(|A - i| - 1) \right] - \frac{N_A}{2}$$

where
$N_i$ = number of pixels having a grey level i, an n bit binary number,

A = mean grey level,
$N_A$ = number of pixels having the average grey level
n = an integer,
comparing the determined values with corresponding desired values and varying the video signal in a sense to reduce the differences between the determined and desired values.

6. A method according to claim 5, wherein n is in the range 3 to 6.

7. A method according to claim 5 wherein n equals three.

8. Apparatus for controlling the grey levels represented by a video signal indicative of a plurality of pixels forming a representation of a scene, comprising
means for storing a portion of the video signal representing at least part of the scene,
means for determining the mean grey level of the stored video signal,
means for determining the value of an indication of a dispersion, relative to said mean level, of the grey levels exhibited by the pixels representing said part,
means for comparing the determined mean level with a desired mean level,
means for comparing the determined value of the indication of dispersion with a desired level of the indication of dispersion, and
means responsive to the comparisons to vary the video signal in a sense to reduce the differences between each of the said determined values and its corresponding desired value.

9. Apparatus according to claim 8, comprising an analogue to digital converter for converting the pixels represented by the video signal to n bit binary numbers, the storing means being connected to receive and store the said numbers.

10. Apparatus according to claim 9 wherein n equals 3, 4, 5 or 6.

11. Apparatus according to claim 9, wherein n equals three.

12. Apparatus according to claim 8, 9, or 10 wherein the means for determining the indication of the dispersion operates on powers of two.

13. An apparatus for controlling the grey levels represented by a video signal representing a scene comprising,
means for storing a portion of the video signal representing at least part of the scene,
means for determining the mean grey level of the stored video signal,
means for determining the value of an indication of the dispersion f(a), of values of grey level of said part where f(a) is given by an empirical equation, $$f(a) = \left[ \sum_{i=0}^{2^n} N_i^2(|A - i| - 1) \right] - \frac{N_A}{2}$$

where
$N_i$ = number of pixels having a grey level i, an n bit binary number,
A = mean grey level,
$N_A$ = number of pixels having the average grey level,
means for comparing the determined mean level with a desired mean level,
means for comparing the determined value of the indication of dispersion with a desired value of the indication of dispersion, and
means responsive to the comparisons to vary the video signal in a sense to reduce the difference between each of the said determined values and its corresponding desired values.

14. Apparatus according to claim 13, wherein the means for determining the indication of dispersion comprises:
means for forming binary counts of the numbers of pixzels having respective ones of the grey levels i, and
means for determining f(a) from the said counts and from the average grey level determined by the mean grey level determining means.

15. Apparatus according to claim 14, wherein the means for forming counts comprises $2^n$ comparators for comparing the n bit binary numbers representing the pixels with $2^n$ numbers representing the grey levels i, and $2^n$ counters responsive to the comparators for forming the counts of the numbers of pixels having each grey level.

16. Apparatus according to claim 14 or 15 wherein the means for determining f(a) comprises:
an input for receiving the said binary counts,
means for shifting the binary counts by selectable numbers of binary places,
control means for causing the shifting means to shift the counts by $(|A-i|-1)$ places, and
means for adding the shifted counts together.

17. Apparatus according to claim 16, wherein the control means comprises a read-only memory containing preset shifts which are addressable by addresses A and i.

18. Apparatus according to claim 16 or 17 wherein the control means causes the said binary count associated with the average grey level to be shifted to make the value of that count zero.

* * * * *